United States Patent
Schmidt

[11] 3,883,256
[45] May 13, 1975

[54] BALL AND SOCKET JOINTS WHICH DO NOT REQUIRE SERVICING AND HAVE AN OUTER JACKET OF A THERMOPLASTIC, AND PROCESS FOR THEIR MANUFACTURE

[75] Inventor: Horst Schmidt, Frankfurt am Main, Germany

[73] Assignee: Hoechst Aktiengesellschaft, Frankfurt am Main, Germany

[22] Filed: Nov. 27, 1973

[21] Appl. No.: 419,190

[30] Foreign Application Priority Data
Nov. 29, 1972  Germany............................ 2258355

[52] U.S. Cl................................ 403/141; 403/270
[51] Int. Cl. ............................................. F16c 11/06
[58] Field of Search ........... 403/131, 122, 133, 135, 403/140, 270, 141; 156/173; 29/149.5 B

[56] References Cited
UNITED STATES PATENTS

| | | | |
|---|---|---|---|
| 3,224,916 | 12/1965 | Soloff et al. | 156/73 |
| 3,695,650 | 10/1972 | Stuck | 403/140 |
| R27,778 | 10/1973 | Potter et al. | 29/149.5 B |

*Primary Examiner*—Andrew V. Kundrat
*Attorney, Agent, or Firm*—Curtis, Morris & Safford

[57] ABSTRACT

A ball and socket joint is provided consisting of a metallic inner ring and an outer jacket of a thermoplastic material. The outer jacket is formed by welding together a female part and a male part by ultrasonics. The play of the bearing is adjusted by limiting the sonotrode advance.

7 Claims, 3 Drawing Figures

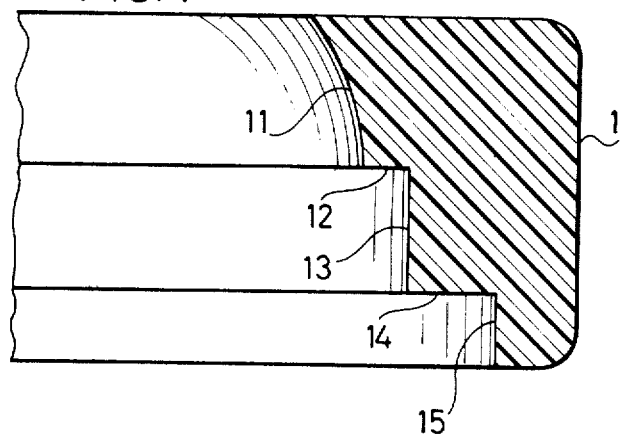
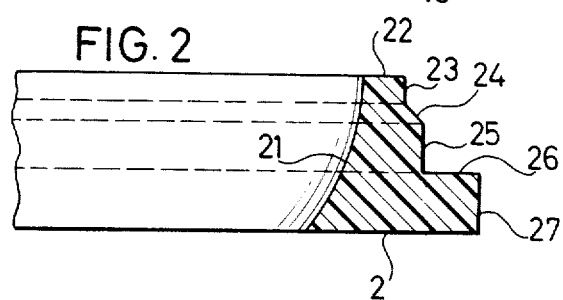
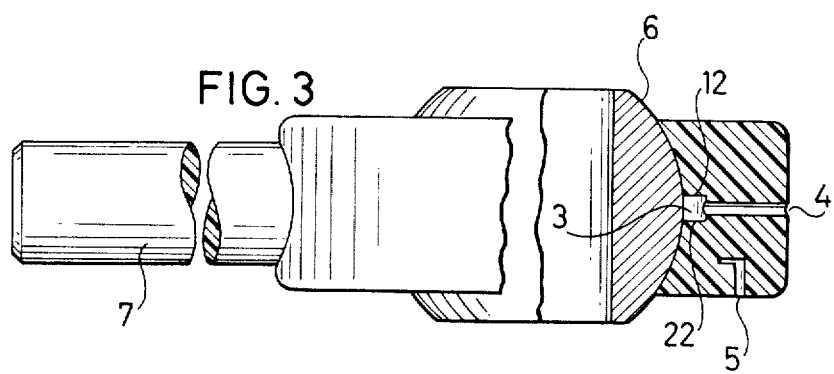

BALL AND SOCKET JOINTS WHICH DO NOT REQUIRE SERVICING AND HAVE AN OUTER JACKET OF A THERMOPLASTIC, AND PROCESS FOR THEIR MANUFACTURE

The invention relates to ball and socket joints which do not require servicing and which consist of a metallic inner ring and an outer jacket of a thermoplastic, material for their manufacture.

In engineering, articulated bearings, value is attached to the bearing not requiring servicing and in addition it should display the best possible frictional behaviour and wear behaviour. In special cases, corrosion-resistant bearings are required. In addition to the material properties of the components which slide against one another, and which determine the behaviour, the play in the bearing is, inter alia, also of considerable importance in determining the working life of the bearing.

It is known that sliding combinations of metals with certain thermoplastics display a particularly advantageous frictional behaviour and wear behaviour. This can be improved further by the use of certain additives in the plastic, such as for example graphite, chalk, molybdenum disulfide, very high molecular polyethylene and polytetrafluoroethylene or viscous lubricants. A single lubrication during assembly of the bearing can also contribute significantly to an improvement in the bearing properties.

It is known that plastics are distinguished by high chemical resistance and corrosion resistance. In combination with a metallic sliding partner of appropriate resistance, bearings which can function even in corrosive media are obtained.

A known process for the manufacture of such ball and socket joints from a metallic inner ring and an outer jacket of a thermoplastic or other materials uses two bearing shells which are placed, together with the inserted inner metallic ring, in an injection moulding tool, and plastic is injected around them. The principal disadvantages of this process are attributed to the high injection pressure when injecting around the bearing shells, the shrinkage and inner stresses which occur on cooling of the outer jacket and the high expenditure of labour and time required in producing the bearing. The high injection pressure and the shrinkage and inner stresses caused by cooling can interfere can limit the maximum play of the bearing and with the load to which the ball and socket joint can be subjected.

Another process for the manufacture of ball and socket joints, with a bearing shell formed of a thermoplastic material, uses an inner ring and an outer jacket of metal wherein heated metal components are dipped into a fluidised powder of a plastic (DAS 1,915,330). This melts the plastic, and after cooling forms a bearing shell between the inner ring and the outer jacket. The adhesion of the plastic to the metal achievable by this process is limited and as a result the axial load to which the bearing can be subjected is comparatively small. In addition it has been proposed to form the bearing shell by injecting a plastic melt between the inner ring and the outer jacket, and allowing it to solidify (DOS 2,058,970). The disadvantages described initially also apply to ball and socket joints manufactured by this process.

Hence, there existed the problem of developing ball and socket joints with an outer jacket of a thermoplastic which do not suffer from the disadvantages described, and a process for the manufacture of such bearings.

In accordance with the present invention it has been found that ball and socket joints which do not require servicing, and consisting of a metallic inner ring and an outer jacket of a thermoplastic, can be manufactured economically and with an adjustable play, if the outer jacket is formed of two parts, a female part 1 with an inner bore defined by a generally spherical layer bore defined by a generally 11 and two adjoining cylindrical surfaces 13, 15 which are staggered stepwise and a male part 2 with an inner spherical layer or curved annular surface 21 and an outer peripheral surface defined by three distinct cylindrical surfaces 23, 25, 27 which are staggered stepwise. The male and female parts are welded together after insertion of the inner metal ring therein, by means of ultrasonics in the region of the middle cylindrical surfaces 13, 25 and of the end faces 14, 26 which adjoin these middle cylindrical surfaces and extend therefrom in an outward direction. The desired play of the bearing is adjusted by limiting the sonotrode advance. An essential characteristic of the invention is that the inner cylindrical surface of the male part forms a centering projection so that the parts weld to one another without shifting. Welding by means of ultrasonics further presupposes that the middle cylindrical surface of the male part 25 is overdimensioned compared to the corresponding dimension 13 of the female part, whilst the outer cylindrical surface of the male part 27 should be under-dimensioned relative to the corresponding dimension 15 of the female part. It is desirable to provide a chamfer 24 as the transition from the inner to the middle cylindrical surface of the male part 25. The diameter of the middle cylindrical surface of the male part 25 should be 0.2 to 1.0 mm, preferably 0.4 to 0.8 mm larger than the internal diameter of the cylindrical surface 13. If this diameter is inadequate or too small, insufficient welding is achieved and as a consequence the axial load which the bearing can withstand is reduced. An excessive overdimension diameter for surface 25 makes excessive demands on the plasticizing capacity of the welding machine, and this can result in an uneconomically long welding time or an inadequate advance of the sonotrode.

The invention therefore proposes to manufacture a ball and socket joint from a metallic inner ring and an outer jacket, composed of two parts, formed of a thermoplastic material, by welding one of these parts is a female part 1, which has an inner annular spherical layer or curved surface 11 defining a portion of a sphere having a radius of curvature substantially equal to the radius of curvature of the ring. This inner curved surface is located with its maximum diameter at a position within the female part, e.g. at a position between one third and one half of the thickness of the female part. Two larger cylindrical surfaces 13, 15 adjoin the larger diameter of the spherical layer or surface 11, in axial alignment therewith, and are staggered stepwise via two radially outwardly extending end faces or surfaces 12, 14. The other of the parts comprises a male part 2 which has an inner generally spherical curved annular surface or layer 21 which defines a portion of a sphere having a radius of curvature substantially equal to the radius of curvature of the ring. The male part also has an outer peripheral surface which is staggered stepwise by three cylindrical axially aligned surface sections of differing diameters 23, 25, 27 and two radially extending end faces or surfaces 22, 26 and a chamfer 24. The inner cylindrical surface of the male part forms a centering projection and is followed by the chamfer transition surface 24 which leads to the middle cylindrical surface 25. This middle cylindrical surface 25 is over-dimensioned relative to the corresponding dimension or internal diameter of the cylindrical surface 13 of the female part. The final outer cylindrical surface portion 27 of the male part is under-dimensioned, i.e. it has a diameter which is smaller than the corresponding dimension or internal diameter of the cylindrical surface 15 of the female part. The welding of the male and female parts is carried out, after insertion of the inner ring into mating engagement with spherical surfaces 11, 21, by means of ultrasonics, in a manner which is in itself known, in the region of the middle cylindrical surfaces 13, 25 and the radially extending end surfaces 14, 26 which adjoint them in an outward direction. The desired play of the bearing is adjusted by limiting the advance of the sonotrode. As will be apparent from the drawing, the distance between surfaces 22 and 26 on the male part is less than the distance between surfaces 12 and 14 on the female part so as to define, between the inner end face 12 of the female part and the end face 22 of the male part, an annular groove 3 adjacent the equator of the spherical layer or surface formed by surfaces 11 and 21. This groove is connected to a radial bore 4 formed in the female part, which bore leads to the exterior of the bearing and can be filled with lubricant.

Accordingly, the ball and socket joint consists of a metallic inner ring and an outer jacket of thermoplastic welded from two parts, i.e. a female part 1 which possesses an inner spherical surface 11 which extends at most to the centre of the female part and two larger cylindrical surfaces 13, 15 which adjoin the larger diameter of the spherical surface and are staggered stepwise via two radial end faces 12, 14, and a male part 2 which possesses an inner spherical surface 21 and an outer peripheral surface which is staggered stepwise and has three cylindrical surfaces 23, 25, 27 and two end faces 22, 26 and a chamfer 24, with the inner cylindrical surface 23 being a centring projection. These parts are welded together in the region of the middle cylindrical surfaces 13, 25 and the end faces 14 of the female part and 26 of the male part adjoining these in an outward direction.

The figures show the bearing according to the invention in an illustrative embodiment.

FIG. 1 shows a female part.

FIG. 2 shows a male part.

FIG. 3 shows the outer jacket of the bearing, welded together in accordance with the invention.

In the figures and the description the numerals denote the following:

1 Female part
11 Inner spherical layer of the female part
12, 14 End faces of the female part
13, 15 Cylindrical surfaces of the female part
2 Male part
21 Inner spherical layer of the male part
22, 26 End faces of the male part
23, 25, 27 Cylindrical surfaces of the male part
24 Chamfer transition between the cylindrical surfaces 23 and 25
3 Annular groove on the equator of the spherical layer
4 Bore
5 Annular groove, resulting from the under-dimensioning of the outer cylindrical surface 27 of the male part
6 Metallic inner ring
7 Articulated rod.

Amongst the large number of known thermoplastics, it is mainly the polyacetals and the polyamides which can be used, for reasons of strength, slide properties and weldability. Since the polyacetals are distinguished by lower water absorption, resulting in better dimensional stability, they are preferred for the ball and socket joints according to the invention. To increase the wear resistance, polyacetals with a ball indentation hardness of at least 1,200 kg/cm$^2$, measured according to DIN 53,456, which contain up to 10 per cent by weight of chalk as a filler, can be used. For mass production, the components of the outer jacket are most economically manufactured by injection moulding.

Where individual bearings are produced, the parts can be machined from blanks.

The following example illustrates the invention.

EXAMPLE

For a ball and socket joint having an inner steel ring with a diameter of 25, 40 mm, a female part and a male part were machined from blanks of polyacetal, melt index MFI 190/2 = 9 g/10 minutes, measured according to DIN 53,735, ball indentation hardness 1,560 kg/cm$^2$, measured according to DIN 53,456. The two parts had the following dimensions:

|  | Female part | Male part |
| --- | --- | --- |
| Diameter of the spherical layer | 25.40 mm | 25.40 mm |
| Height of the spherical layer | 6.0 mm | 6.0 mm |
| Diameter of the inner cylindrical surface | 29.00 mm | 28.90 mm |
| Height of the inner cylindrical surface | 4.0 mm | 1.0 mm |
| Diameter of the middle cylindrical surface | — | 29.80 mm |
| Height of the middle cylindrical surface | — | 2.5 mm |
| Diameter of the outer cylindrical surface | 36.0 mm | 35.5 mm |
| Height of the outer cylindrical surface | 4.00 mm | 2.5 mm |
| Chamfer angle |  | 45° |
| External diameter of the outer jacket | 42.00 mm |  |

The inner ring was inserted into the female part and the male part was then pushed by means of the centring projection into the female part.

The parts assembled in this way were welded by means of a commercially available ultrasonic welding machine under a welding pressure of 5.6 kg/cm$^2$ and using a frquency of 20 kilocycle/sec., the normal rating being 0.6 kilowatt. The sonotrode advance was adjusted so that a bearing play of 0.03 mm resulted. The welding time was 2 seconds.

As a criterion of the quality of the welding, the axial load to which the ball and socket joint could be subjected was tested in a tensometer. A breaking load of 400 kg was measured.

What is claimed is:

1. A ball and socket joint comprising a metallic inner ring and an outer jacket formed of a thermoplastic material; said inner ring being generally spherical in shape and being movably received and mounted in said outer jacket; said outer jacket being formed of cooperating male and female parts; said female part having an internal bore formed therein for receiving a portion of said ring and said male part, said internal bore being defined by: 1) an annular inner curved surface defining a portion of a sphere having a radius of curvature substantially equal to the radius of curvature of said ring and having its maximum diameter located within said female part and (2) first and second inner cylindrical surfaces formed in said female part in coaxial alignment with said annular curved surface; said first cylindrical surface being located immediately adjacent said curved surface and having a diameter greater than said maximum diameter of the curved surface thereby to define a first radially extending step in said female part; said second cylindrical surface being located immediately adjacent said first cylindrical surface and having a diameter greater than said first cylindrical surface thereby to define a second radially extending step in said female part said male part having two opposite sides and an internal bore formed therein for receiving a portion of said ring and an external peripheral surface; said internal bore of the male part being defined by an inner annular curved surface defining a portion of a sphere having minimum and maximum diameter portions located respectively on opposite sides of the male part and having a radius of curvature substantially equal to the radius of curvature of said ring; said external peripheral surface being radially outwardly staggered stepwise and having first, second and third coaxially aligned cylindrical surface portions; said first cylindrical surface portion being located adjacent the maximum diameter of the inner curved surface of the male part and having a diameter less than the diameter of the first cylidrical surface of the female part; said second cylindrical surface portion following said first portion and having a diameter slightly greater than the diameter of the first cylindrical surface of the female part; and said third cylindrical surface portion following said second portion and having a diameter which is greater than the diameter of said second portion and less than the diameter of said second cylindrical surface of the female part; thereby to define a radially extending step on said male part said first cylindrical surface portion being joined to said second cylindrical surface portion by an outwardly flared annular chamfered surface, whereby the first cylindrical surface portion of the male part acts as a centering projection upon insertion of the male part into the female part; said male and female parts being secured together by welding in the region of the first cylindrical surface of the female part and the second cylindrical surface portion of the male part.

2. A ball and socket joint according to claim 1, wherein said male and female parts of the outer jacket have predetermined dimensions selected such that when the parts are welded together the radial step of the male part engages the second radial step in the female part and the side of said male adjacent the maximum diameter of its inner annular curved surface is axially spaced from the first step of the female part, to define therebetween an annular groove; said female part having a radially extending bore formed therein which communicates with the groove and the exterior of the outer jacket.

3. A ball and socket joint according to claim 2, wherein the annular groove is filled with a lubricant.

4. A ball and socket joint according to claim 1, wherein the outer jacket consists of a polyacetal having a ball indentation hardness of at least 1,200 kg/cm$^2$, measured according to DIN 53,456.

5. A ball and socket joint according to claim 4, wherein the polyacetal contains up to 10 per cent by weight of chalk as a filler.

6. A ball and socket joint according to claim 1, wherein the outer jacket consists of injection-moulded parts.

7. A ball and socket joint comprising an inner ring and an outer jacket formed of a thermoplastic material, said inner ring being generally spherical in shape and being movably received and mounted in said outer jacket; said outer jacket comprising cooperating male and female parts, said female part having an internal bore formed therein having first and second coaxially aligned sections for respectively receiving a portion of said ring and said male part; said first section of said bore being defined by an annular inner curved surface defining a portion of a sphere having a radius of curvature substantially equal to the radius of curvature of said ring and having its maximum diameter located within said female part; said male part having two opposite sides and an internal bore formed therein for receiving a portion of said ring and an external peripheral surface which is generally complementary to the second section of the bore in said female part; said internal bore of the male part being defined by an inner annular curve defining a portion of a sphere having minimum and maximum diameter portions located respectively on opposite sides of the male part and having a radius of curvature substantially equal to the radius of curvature of said ring whereby said male part may be inserted, in substantially mating engagement, in the second section of the bore of said female part with the side thereof adjacent the maximum diameter of its inner annular curved surface located adjacent the maximum diameter of the inner annular curved surface of the female part to retain said ring therebetween; said male and female parts being secured together by welding in the region of the second bore section of the female part said male and female parts defining an annular groove therebetween adjacent the maximum diameters of their respective inner annular curved surfaces and said female part has a radially extending bore formed therein providing communication between said annular groove and the exterior of the outer jacket through which lubricant may be injected to the ring.

* * * * *